United States Patent
Zanetti (10) Patent No.: US 7,806,043 B2
(45) Date of Patent: Oct. 5, 2010

(54) APPARATUS AND METHOD FOR PREPARING AND DELIVERING A BEVERAGE WITH THE USE OF A RAW MATTER CONTAINED IN A CARTRIDGE

(75) Inventor: Martino Zanetti, Villorba (IT)

(73) Assignee: Hausbrandt Trieste 1892 SpA, Nervesa della Battaglia (IT)

( * ) Notice: Subject to any disclaimer, the term of this patent is extended or adjusted under 35 U.S.C. 154(b) by 585 days.

(21) Appl. No.: 11/663,623

(22) PCT Filed: Oct. 1, 2004

(86) PCT No.: PCT/IT2004/000541

§ 371 (c)(1),
(2), (4) Date: Mar. 22, 2007

(87) PCT Pub. No.: WO2006/038227

PCT Pub. Date: Apr. 13, 2006

(65) Prior Publication Data

US 2008/0148957 A1    Jun. 26, 2008

(51) Int. Cl.
    *A47J 31/40* (2006.01)
(52) U.S. Cl. .................. 99/295; 99/302 R
(58) Field of Classification Search .............. 99/295, 99/302 R
    See application file for complete search history.

(56) References Cited

U.S. PATENT DOCUMENTS

| | | | | |
|---|---|---|---|---|
| 3,292,527 A | | 12/1966 | Stasse | |
| 3,470,812 A | * | 10/1969 | Levinson | 99/295 |
| 4,136,202 A | * | 1/1979 | Favre | 426/77 |
| 4,644,856 A | * | 2/1987 | Borgmann | 99/295 |
| 5,127,318 A | * | 7/1992 | Selby, III | 99/295 |
| 5,472,719 A | | 12/1995 | Favre | |
| 5,794,519 A | * | 8/1998 | Fischer | 99/295 |
| 5,899,137 A | * | 5/1999 | Miller et al. | 99/295 |
| 6,708,600 B2 | * | 3/2004 | Winkler et al. | 99/295 |
| 6,966,251 B2 | * | 11/2005 | Yoakim | 99/295 |
| 7,063,238 B2 | * | 6/2006 | Hale | 222/325 |
| 7,316,178 B2 | * | 1/2008 | Halliday et al. | 99/295 |

(Continued)

FOREIGN PATENT DOCUMENTS

EP    0 272 922 A    6/1988

(Continued)

OTHER PUBLICATIONS

International Search Report dated Apr. 5, 2005 and Written Opinion from the corresponding PCT/IT2004/000541.

(Continued)

*Primary Examiner*—Reginald L Alexander
(74) *Attorney, Agent, or Firm*—Katten Muchin Rosenman LLP (57) ABSTRACT

The present invention provides for at least a dispensing spout to be directly formed in the sealing membrane that closes the bottom of a capsule containing an edible raw material for preparing a beverage, e.g. coffee. In this manner, the beverage is able to directly fall from the capsule into a drinking vessel arranged therebelow. What is claimed are both a machine, characterized by the means that form the spout and the open bottom of the container in which the capsule is loaded, and a method for preparing and dispensing the beverage.

14 Claims, 7 Drawing Sheets

U.S. PATENT DOCUMENTS

| | | | |
|---|---|---|---|
| 7,531,198 B2 * | 5/2009 | Cortese | 426/433 |
| 2003/0145736 A1 * | 8/2003 | Green | 99/280 |
| 2007/0144355 A1 * | 6/2007 | Denisart et al. | 99/275 |

FOREIGN PATENT DOCUMENTS

| | | |
|---|---|---|
| EP | 0 389 141 A | 9/1990 |
| EP | 0521510 B1 | 12/1996 |
| EP | 1034729 A1 | 9/2000 |
| EP | 1 295 554 A | 3/2003 |
| EP | 1 440 639 A | 7/2004 |
| WO | 2004087529 | 10/2004 |

OTHER PUBLICATIONS

International Preliminary Report on Patentability Opinion from the corresponding PCT/IT2004/000541.

* cited by examiner

APPARATUS AND METHOD FOR PREPARING AND DELIVERING A BEVERAGE WITH THE USE OF A RAW MATTER CONTAINED IN A CARTRIDGE

FIELD OF THE INVENTION

The present invention refers to a machine and a method for preparing and dispensing a beverage starting from raw material that is contained in a sealed capsule.

BACKGROUND OF THE INVENTION AND STATE OF THE RELATED ART

Largely known in the art is the use of sealed capsules usually containing a single-dose amount of raw materials that, as a consequence of steam or water under pressure being fed into the capsules themselves, produce a beverage.

An example of a traditional capsule of this kind, which is disclosed in the patent publication EP-A-0 521 510, comprises a body portion having a slightly flared shape, which is made of plastics moulded integrally with the bottom wall thereof, the latter being in the shape of a planar disk with a plurality of reduced-thickness zones and supporting a filter on the inner face thereof. This capsule is completed by an upper wall formed by a membrane. At the moment of its use, the capsule is loaded in a machine, where said upper wall is perforated so as to enable water under pressure to be let into the capsule, while another piercing device provides a plurality of orifices in said reduced-thickness zones of the bottom wall. The beverage practically flows out of the capsule through said orifices in a substantially uncontrolled manner, particularly in the case of capsules containing raw materials in powder form, such as for instance ground coffee of the non-instant kind, which oppose a certain resistance to the flow of water under pressure.

This is basically the reason why machines used in conjunction with capsules of the traditional type must comprise conduits to deliver the beverage from the point at which it flows out of the capsule up to the cup or other vessel in which the beverage itself is due to be received for drinking. In this connection, see for instance the patent publication EP-A-1 034 729. These conduits, however, are subject to soiling, owing to it being quite difficult and awkward—if not right away impossible—for them to be regularly and correctly cleaned. Particularly in the case of a not so frequent use of the machine, when beverages with a certain content of fatty substances (e.g. coffee and meat stock or consommé) are prepared, there exists a real risk for these substances to eventually ferment and grow rancid in the conduits, and this is certainly a development that people due to drink the beverages flowing out of said conduits are quite likely to find rather unpleasant.

Another example of the related state of the art is the machine disclosed in the patent publication U.S. Pat. No. 5,472,719, in which the piercing device used to perforate the bottom wall of the capsule performs at the same time also as a collecting device for the beverage flowing out through the orifices created by the same device. Some of the embodiments discussed in the above-cited patent call for these combined piercing and collecting devices to be provided as disposable one-way parts, in the sense that it is contemplated that a new device has to be used for each single capsule. This, however, further to determining an obvious increase in costs, gives rise to readily appreciable problems in terms of stock management, storage, handling and disposal of these devices. In another embodiment described in the same patent, the combined piercing and collecting device is a part of the same unit of the machine that supports the capsule. It is anyway quite clear that, if it fails to be cleaned frequently, it may well give rise to the same kind of drawbacks as already discussed with reference to EP-A-0 521 510.

SCOPE AND SUMMARY OF THE INVENTION

It is therefore a purpose of the present invention to provide a machine for preparing beverages, which, when associated to a sealed capsule of an improved construction for containing the raw material, does fully away with the afore-indicated drawbacks, without anyway incurring any penalty in terms of construction complications and costs as compared with traditional machines.

Figure 7:
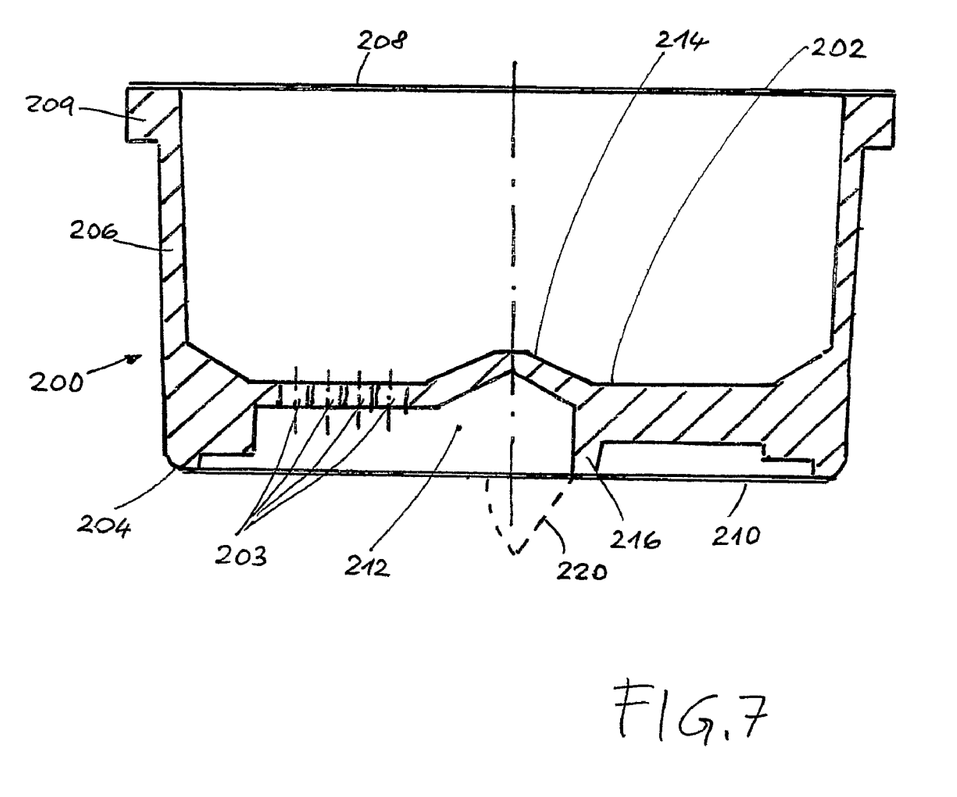
FIG. 7 is a view of a capsule intended for use in a machine according to the present invention, the capsule being shown according to two vertical sectional planes intersecting on the axis of the capsule.

The capsule to be preferably used in conjunction with this machine (see also the patent application No. PCT/EP03/12338 filed by this same Applicant) is illustrated in FIG. 7, where it is generally indicated with the reference numeral 200. This capsule can be noticed to have a bottom 202, which is provided with a plurality of filtering orifices 203 and is recessed with respect to the lower edge 204 of the flared body 206 of the capsule. It further includes an upward facing central cusp 214 and, below said cusp, i.e. extending downwards therefrom, a short serrated cylindrical wall 216. Sealing of the capsule 200 prior to its being used is ensured by a first membrane or foil 208, which is bonded or welded onto and along said upper edge 209, and a second membrane or foil 210, which is in turn bonded or welded onto and along the lower edge 204 of the body 206 and extends to almost touch, or even to come into contact with, the free end of said serrated cylindrical wall 216.

The main object of the present invention is therefore a machine for the preparation of beverages, starting from a raw material contained in a capsule of the above-described kind, incorporating the characteristics as recited in the appended claims.

Another object of the present invention is a method for preparing beverages in conjunction with the use of said machine, said method incorporating in turn the characteristics as recited in the appended claims.

SHORT DESCRIPTION OF THE DRAWINGS

Features and advantages of the present invention will anyway be more readily understood from the description of a preferred, although not sole embodiment, which is given below by way of non-limiting example with reference to the accompanying drawings, in which.

DESCRIPTION OF A PREFERRED EMBODIMENT OF THE INVENTION

The machine being discussed here is an electrically powered machine that enables a beverage to be prepared at a rate of a single dose at a time, such as for example a cup of espresso coffee from each capsule. For reasons of greater illustrative simplicity, and from the viewpoint of the present invention that essentially relates to the brewing unit of the machine, all those parts that are constructively and functionally similar to the ones used in conventional machines will be only dealt with concisely in the following description, considering that they are generally well known to all those skilled in the art.

Figure 1:
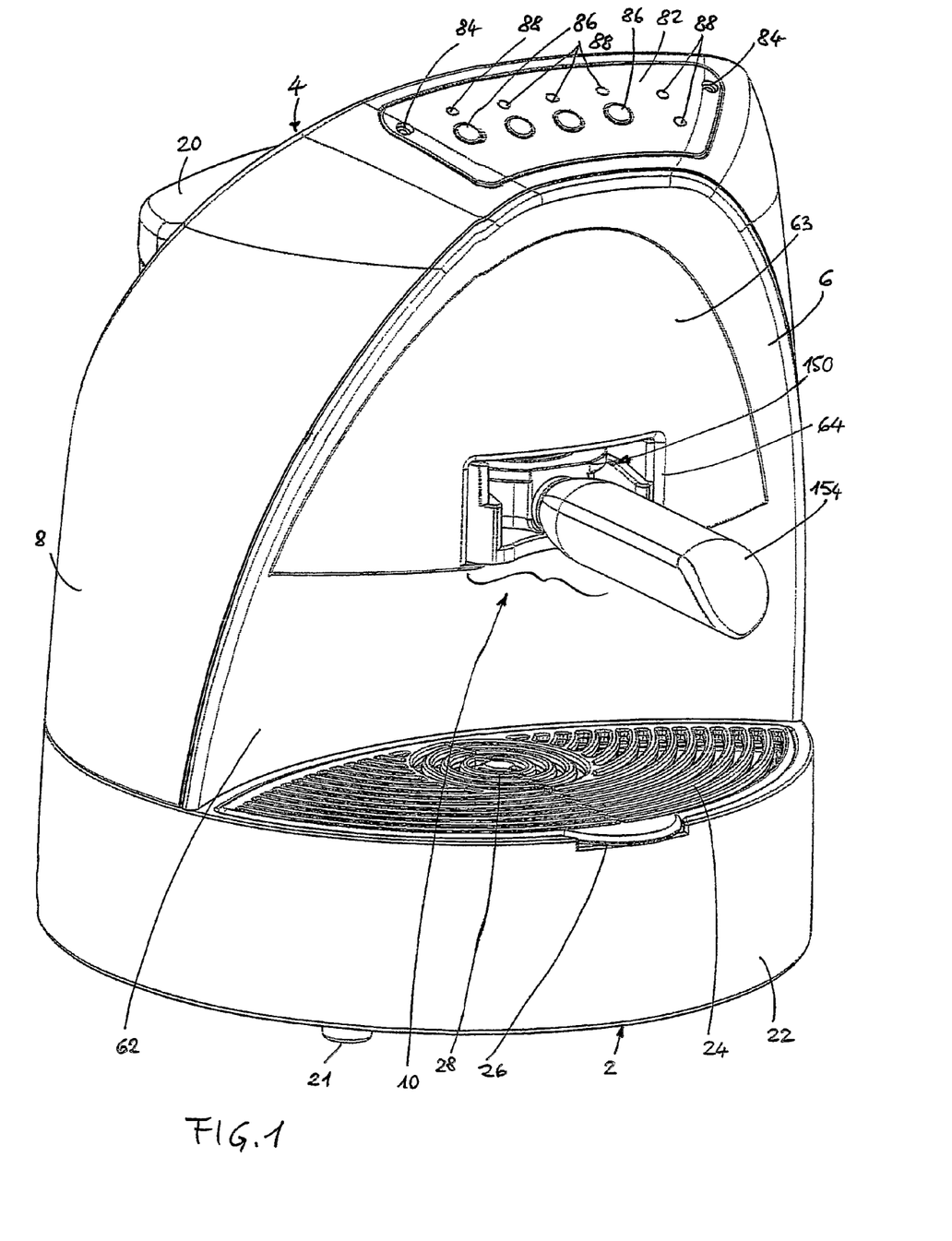
FIG. 1 is an overall three-dimensional view of a machine for the preparation of espresso coffee according to the present invention.

When viewed frontally from the outside—i.e. as it is illustrated in FIG. 1, actually—the machine comprises a metal, substantially cylindrical base member 2, duly provided with adjustable feet 21 for correct levelling, from which there rises upwards, asymmetrically with respect thereto, a forward bending structure 4 that is made of metal and/or structural plastics. This structure is defined by a concave front wall 6, a peripheral mantle 8 roughly in the shape of an upturned U, and a rear wall (not shown), which is partially open to receive the water reservoir 20 (only the upper end portion thereof being shown in the Figure).

Figure 2:
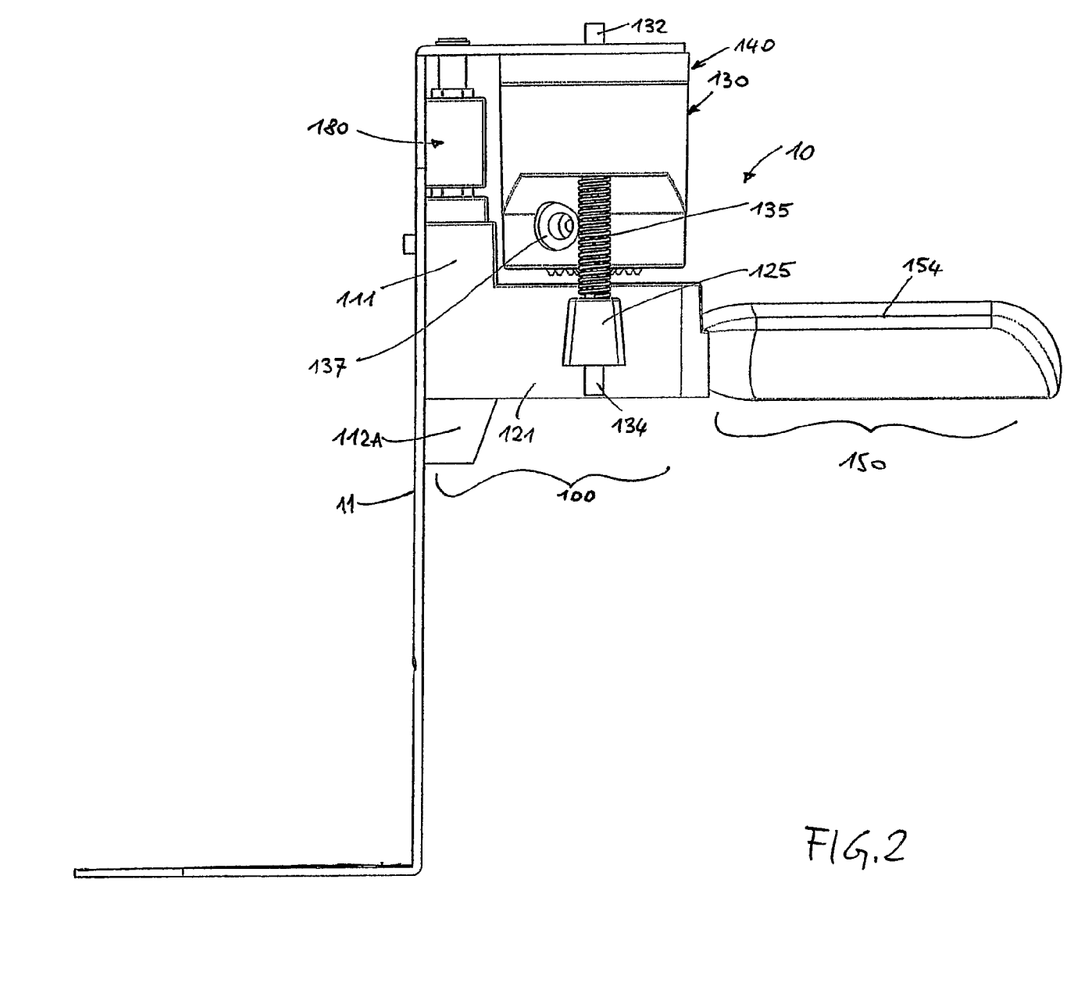
FIG. 2 is a side view of a sub-assembly of the machine shown in FIG. 1, in which said sub-assembly comprises the brewing unit.

From the concave front wall 6 there is protruding forwards, but in any case still within the periphery of the base member 2, a box-like body 62 accommodating the functional unit of the machine, which is indicated generally by the reference numeral 10 and shall be described in greater detail further on. The functional unit 10 of the machine comprises a device 150 for supporting a capsule 200, which is inserted through a window 64 provided in the front wall 63 of the box-like body 62. Part of this device 150 is a handgrip 154 that, as shown in FIG. 2, projects forwards beyond the box-like body 62.

The portion 22 of the base member 2 that lies below and in front of the front wall 6 of the structure 4 is closed at the top by a metal grille-like cover 24, which is adapted to be lifted by means of a handgrip 26 and is provided with a central portion 28 adapted to receive and support a vessel (a cup or the like, not shown in the Figure) into which the beverage is dispensed for drinking. Within that same portion 22 of the base member 2 there is housed a drip pan (not shown) for collecting possible liquid leaking from the functional unit 10 or the vessel intended to receive the beverage, as well as residues of raw material (coffee grounds) that remain in the capsule upon the beverage having been dispensed. The handgrip 26 enables the grille-like cover 24 to be lifted in order to empty and clean said drip pan.

Inside the structure 4 there are housed various electric devices of a largely known type for operating and controlling the machine, which are connected to a plurality of push-buttons 86 and indicator lights 88 accessible on a control panel 82, which is removable to special maintenance and repair purposes. To this purpose, said control panel is in fact provided with holes 84 for fastening screws (not shown).

As far as the present invention is concerned, the most important part of the machine is constituted by the above-mentioned functional unit 10 which, as already indicated above, is housed in the box-like body 62 below the peripheral mantle 8 of the structure 4. This functional unit—as shown in greater detail in FIGS. 2, 3 and 4—comprises a first stationary part 100, which will be referred to as the active part in this description and is supported by an upright member 11 made of press-formed sheet-metal and housed within the same structure 4 (see FIG. 2), and a second part, which will be referred to as the passive part in this description and comprises the aforementioned capsule supporting device 150 (see FIG. 3).

Figure 3:
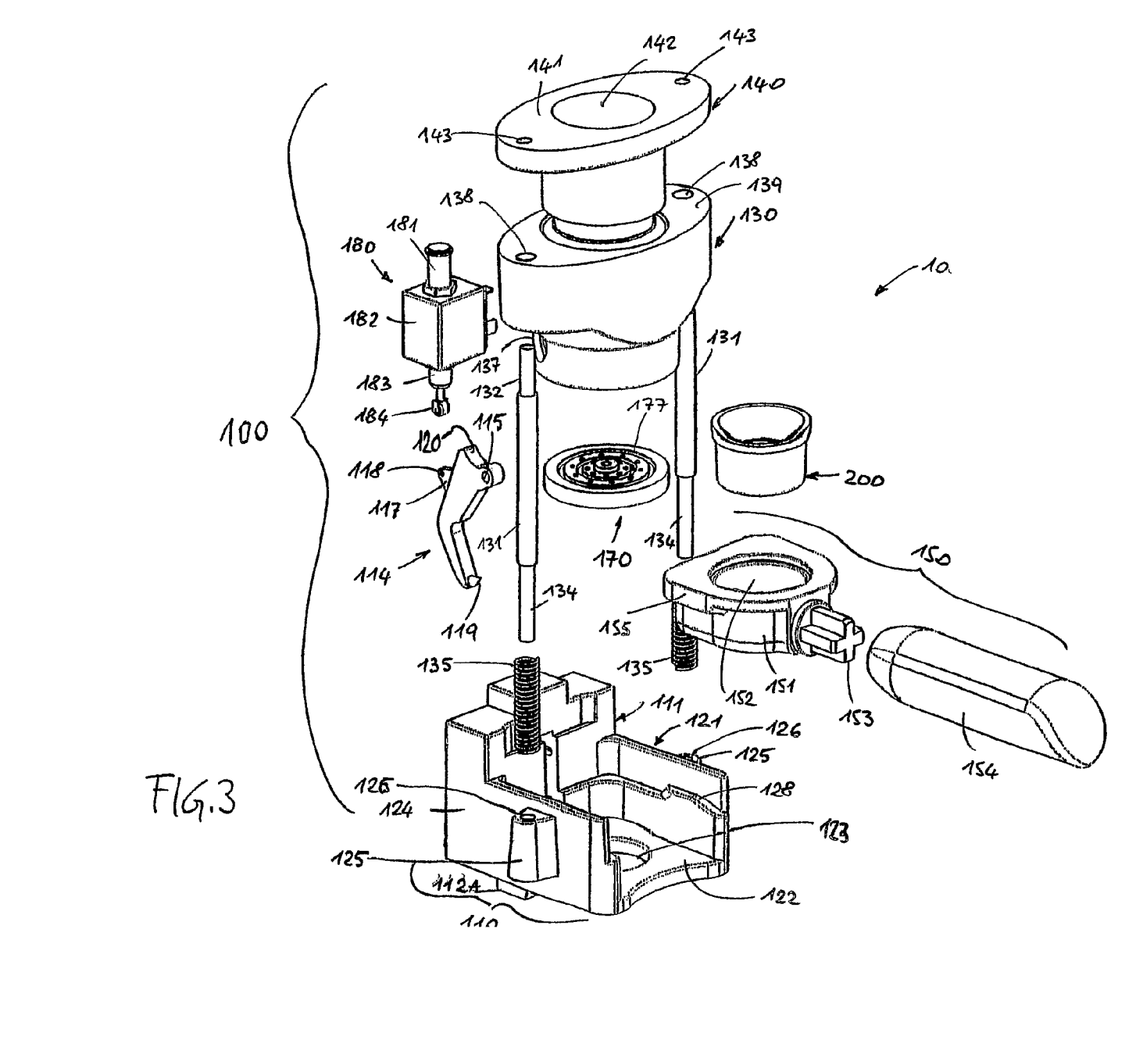
FIG. 3 is an exploded view of the brewing unit.
Figure 4:
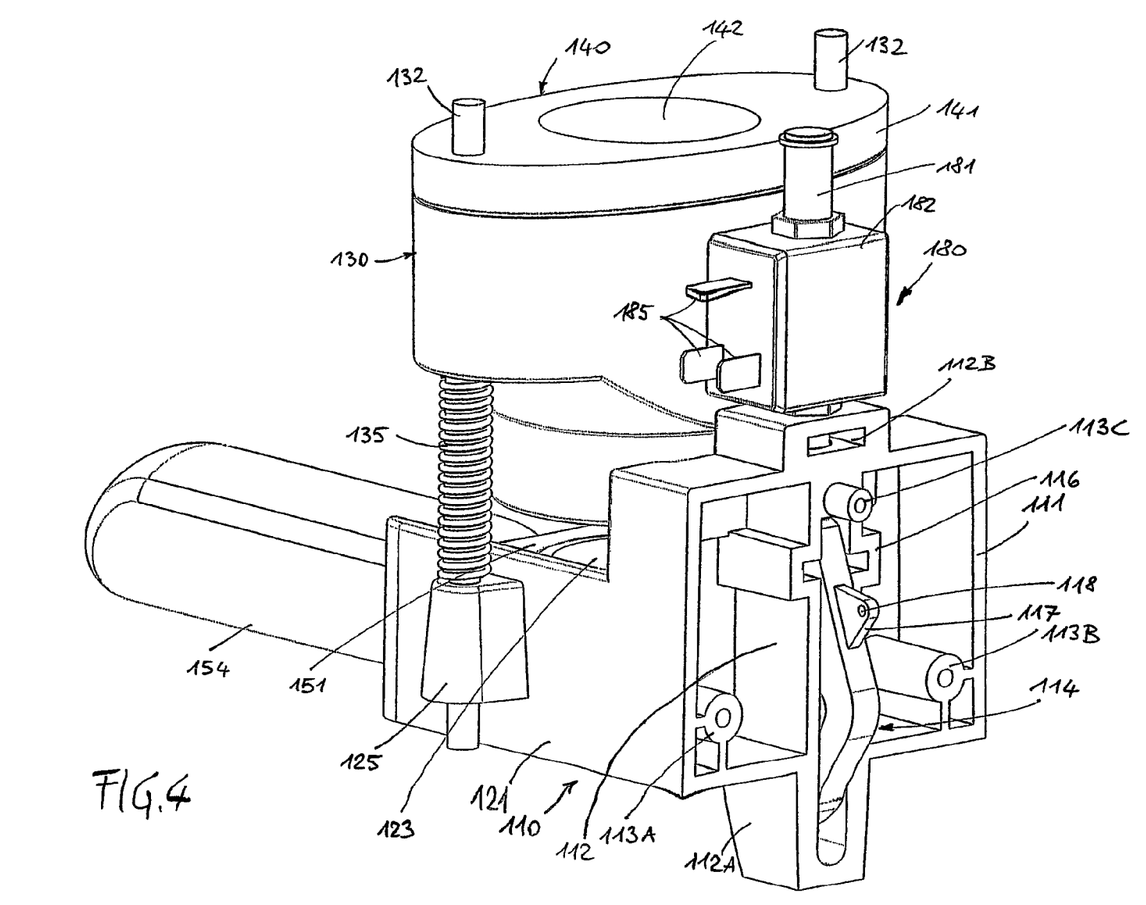
FIG. 4 is a three-dimensional rear view of the brewing unit.

With respect to FIG. 2 et al., the active part 100 of the functional unit 10 comprises:

(a) an L-shaped base member 110 made as a unitary piece by casting or press-forming, comprising a vertical arm 111 and a horizontal arm 121, wherein in particular:
  the vertical arm 111 comprises a box-shaped accommodation 112, which is open both on the front side, i.e. towards the said horizontal arm 121, and on the back side, and is further provided with a lower appendix 112A projecting downwards. On the back side of the vertical arm 111 and at the sides of the accommodation 112 there are provided the openings 113A and 113B intended for receiving the screws (not shown) used to fasten the entire active part 100 of the functional unit 10 to the upright member 11 (see FIG. 4). In the accommodation 112 there is arranged, along a vertical plane, lever 114, roughly in the shape of an L, that forms one of the main features if the present invention. This lever 115 is made by press-forming or machining so as to feature a rather substantial thickness and, as viewed laterally from the top down, includes: an upper portion 120 featuring an upward concave contour, and a first bore 115 located in the widening zone 116 of the box-like accommodation 112, intended to receive the hinging pin 127 (visible in FIGS. 5 and 6) for the same lever 114; an intermediate portion provided with a rearwards protruding wing 117, where a second bore 118 of the lever 114 is provided; a lower portion that terminates in a punch 119. A return spring (not shown for reasons of greater illustrative simplicity) connects the lever 114 to the vertical arm 111 of the base member 110, since the upper end portion thereof is attached by means of a screw (not shown, either) to a proper receptacle 113C located on top of the box-like accommodation 112, whereas the lower end portion thereof engages said second bore 118;
  the horizontal arm 121 of the base member 110 has a U-shaped cross-section defined by a lower horizontal wall 122 and two vertical walls 124. The lower wall 122 is provided with a circular bore 123 communicating with said box-like accommodation 112 on the front side of the base member 110. The vertical walls 124 are provided on the outside with respective lugs 125, a vertical threaded through-bore 126 being provided to pass therethrough;

(b) the brewing unit, which comprises a first and a second body portion 130, 140 in the shape of cylindrical cups with respective enlarged heads 139, 141. These cup-shaped body portions 130 and 140 are aligned along a vertical axis, which is also the axis of the above-mentioned bore 123 in the bottom wall 122 of the horizontal arm 121 of the base member 110. The first cup-shaped body portion 130, in the lower portion of which there is located the port 137 for the admission of the dose of hot water required to prepare the beverage, accommodates therewithin, in a slightly loose manner, i.e. under a slight slack, the second cup-shaped body portion 140, which is attached to the upper portion of the upright member 11. The first cup-shaped body portion 130 rests on a pair of springs 135 that are wound about two vertical tie rods 131 passing through two bores 138 of the same first cup-shaped body portion 130 and provided with threaded end portions 132 and 134 allowing them to be screwed onto corresponding threaded bores 143 of the second cup-shaped body portion 140 at the top, as well as to corresponding threaded bores 126 of the lugs 125 at the bottom. The second cup-shaped body portion 140 has a first aperture 142 provided in the enlarged head 141, as well as a second aperture 147 provided in the bottom 148 thereof, which enables the cavity of the second cup-shaped body portion 140 to communicate with the head 139 of the first cup-shaped body portion 130;

(c) the piercing device for the capsule 200, which is also part of the brewing unit and is illustrated in an overturned state in FIG. 3 so as to make the construction details thereof more conspicuous, consists of a disk 170 comprising:
- a central through-bore 178 for fastening by means of a central screw 174 to the bottom 136 of the first cup-shaped body portion 130 below the inlet port 137 for the admission of the water required to prepare the beverage;
- accommodations 171 and 172 intended to receive sealing gaskets (not shown) on the same cylinder 130;
- a groove 177 on the front surface having a slightly larger than the upper edge 209 of the capsule 20;
- on the same front surface, between the bore 178 and the groove 177, a plurality of vertical needles 173 for piercing the upper membrane or foil 209, as well as vertical nozzles 175 to inject water under pressure into the capsule 200, as this shall be better explained further on in this description;

(d) a device 180 (see FIGS. 4 to 6) for actuating the lever 114, which comprises:
- a core or plunger 181 made of a magnetic material, such as for instance a permanent magnet;
- a solenoid 182, within which said plunger 181 is able to slide, and which is fastened, by means of a Seger ring (not shown) inserted in an accommodation 112B, to the upper portion of the vertical arm 111 of the box-like base member 110. The solenoid 182 is energized via electric conductors (not shown) and Faston-type connecting terminals 185 (shown in FIG. 5);
- a rod 183, firmly joined to the plunger 181, which protrudes downwards beyond the vertical bulk of the solenoid 182 and is provided with a small idler roller 184 at the free end portion thereof. The force exerted by the return spring provided between the receptacle 113C and the bore 118 ensures that the roller 184 is constantly kept in contact with the upwards facing concavity of the upper end portion 120 of the lever 114.

Figure 5:
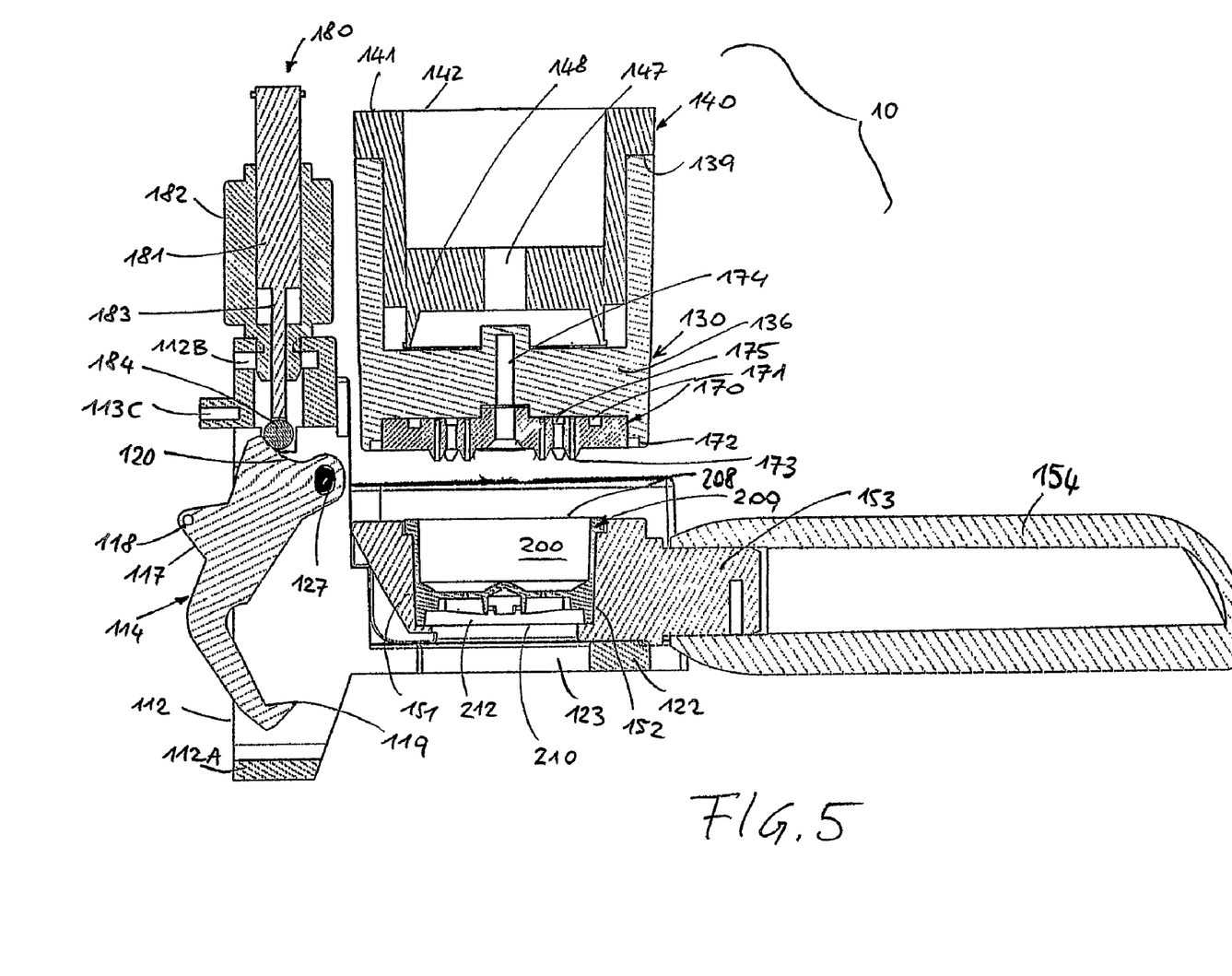
FIG. 5 is a cross-sectional view along the V-V line in FIG. 2, in which the brewing unit is shown in the configuration it takes when a capsule containing the raw material for the beverage is loaded therein.
Figure 6:
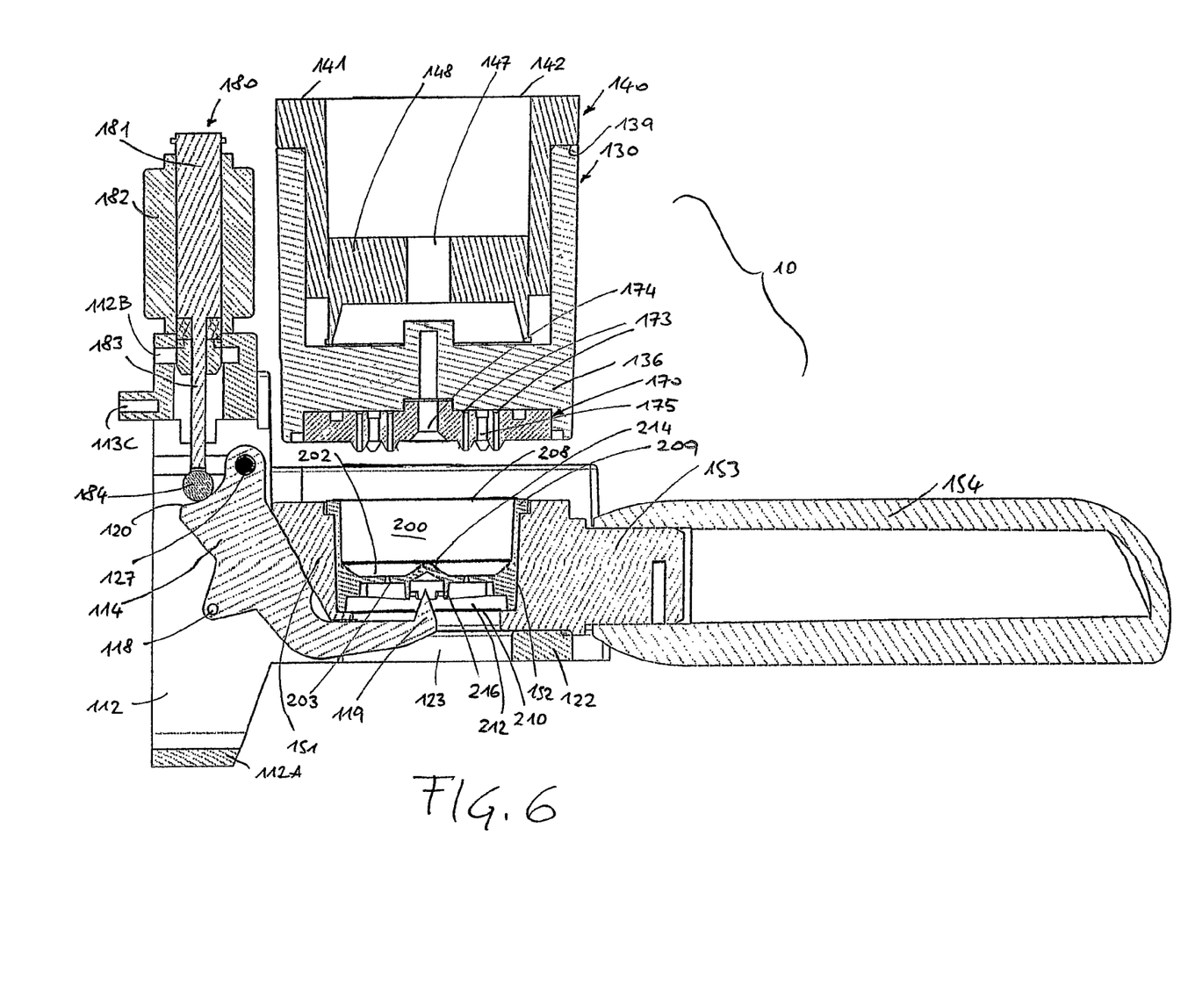
FIG. 6 is a similar view as in FIG. 5, in which the brewing unit is however shown in the configuration it takes when the capsule is pierced in view of the preparation and the delivery of the coffee beverage.

The device 150, which forms the so-called passive part of the functional unit 10, comprises a metal container 151, made by casting, the cavity 152 of which accommodates a capsule 200 of the kind that has been briefly described earlier in this description with reference to FIG. 7. According to another major feature of the present invention, the container 151 has a bottom 156 that is open and provided with a step-like configuration which, in conjunction with a step-like configuration at the upper mouth of the cavity 152, is intended to hold and retain the capsule 200, as this is best shown in FIGS. 5 and 6. On its outer surface, said container 151 is provided laterally with male means 155 for coupling with corresponding female means 128 that are provided on the inner vertical surfaces of the horizontal arm 121 of the box-shaped base member 110 (see FIG. 3). Furthermore, the container 151 is provided frontally with a cross-shaped shank 153 for coupling with an elongated handle 154, the latter being preferably made of a thermosetting material.

Next, the mode of operation of this machine shall be described in greater detail.

In the first place, the user places a suitable vessel, i.e. a cup or similar vessel provided to collect the dispensed beverage for drinking, on the specially provided central support area 28 of the grille-like cover 24, and then loads in the cup-shaped cavity 151 a new capsule 200, which contains a dose of the raw material required to prepare the desired beverage, in such a manner as to prevent the membrane or foil 208 forming the upper wall thereof from protruding upwards from the same container 151. With the help of the handle 154, the passive part 150 of the functional unit 10 is introduced into the window 64 in the front wall 63 of the box-like body 62 and caused to couple with the active part 100 by means of said male and female means 155 and 158 that enable the container 151 to be locked in place on the base member 110 of the functional unit 10.

The capsule 200, which abuts and rests against the aforementioned step-like configurations of the through-aperture or cavity 152, comes in this way to lie axially aligned not only with the bore 156, but also with the two cup-shaped body portions 130, 140 and the circular bore 123 in the horizontal arm 121 of said base member 110, exactly beneath the piercing device 170. The configuration of the functional unit 10 of the machine as illustrated in FIG. 5 is the configuration under resting conditions, i.e. with the solenoid 182 de-energized so that the magnetic core 181 is raised, since the counter-spring (not shown) keeps the farthest end portion, with respect to the pin 127, of the upper concave portion 120 of the lever 114 in contact with the idler roller 184. The result is that, not only the punch 119, but practically the entire lever 114, except for the wing 117 where it is situated the bore 118 provided for fastening the counter-spring, lies inside the box-like accommodation 112.

At this point, the user, by operating in a fully traditional manner the buttons 86 on the control panel 82 accordingly, starts the operation of the machine to carry out a cycle for preparing and dispensing the desired beverage.

The operation of the machine starts with a rotation of the lever 114 about the pin 127, which is brought about by supplying power to, i.e. energizing the solenoid 182 via its power-supply terminals 185, so that the magnetic core, i.e. plunger 181 is caused to slide upwards against the reaction force of the counter-spring, thereby acting on the upper concave portion 120 of the lever 114. The lever 114 is in this way caused to move from its resting configuration, as illustrated above, to the operating configuration illustrated in FIG. 6, in which it can be noticed that the lower portion thereof is penetrating, from the bottom upwards, the bore 123 in the bottom wall 122 of the box-like base member 110 and, as a result, the bore 156 of the container 151, so that the punch 119 is enabled to reach, inside the serrated cylindrical wall 216, up to a point just below the tip of the cusp 214 of the bottom 202 of the capsule 200 upon its having caused the lower membrane 210 to tear and deform. According to a further major feature of the present invention, such tearing and deforming effect causes a kind of spout—as shown with a dashed line and generally indicated at 220 in FIG. 7—in the lower membrane 210, wherein such spout comes to practically lie aligned along the common axis of the capsule 200, the two cup-shaped body portions 130 and 140, the bore 156 of the container 151, and the circular bore 123 in the horizontal arm 121 of the base member 110.

As soon as the above-cited spout 220 is formed in this manner, the power supply to the solenoid 182 is cut off, and the solenoid itself is de-energized, so that the reaction force of the counter-spring prevails over the overall weight of the plunger 181, the rod 183 and the roller 184 and, as a result, the lever 114, by pivoting back in the reverse direction, is able to move from this operating configuration back to its previously described resting configuration.

In the meantime, or even immediately thereafter, in a manner that is largely known as such to all those skilled in the art, a pump (provided internally in the machine and not shown in the Figures) delivers water under pressure into the second cup-shaped body portion 140, while an electric boiler (provided internally in the machine and not shown in the Figures, either) starts to heat up the dose of water required for the preparation of the desired beverage. Through the apertures 142, 147 and the inner cavity of the second cup-shaped body portion 140, the water under pressure reaches the bottom 136 of the first cup-shaped body portion 130, which is then forced to descend, jointly with the disk 170 of the piercing device for the capsule 200, by sliding down along the second cup-shaped body portion 140.

Owing to this descending movement, the disk 170 goes down to a point at which the upper edge 209 of the capsule 200 snaps into the groove 177 to be retained there, with the result that the capsule 200 is locked in its position in the container 151. Owing to the same descending movement, the needles 173 of the disk 170 come to perforate, at a plurality of positions, the upper membrane 208 of the capsule 200. Immediately thereafter, the boiling water under pressure is let into the capsule 200 by the nozzles 175 in the disk 170, through the perforations that had been previously created by the needles 173 in the upper membrane 208. The beverage is in this way brewed to eventually flow filtered out of the capsule through the orifices 203, whereas, owing also to the particular conformation of the bottom 202 both towards the interior and the exterior of the capsule (in this connection, see the afore cited patent application No. PCT/EP03/12338), the inlet water is allowed to vigorously mix with the raw material inside the chamber 212 that forms immediately upstream of the dispensing spout 220. From this spout 220, the beverage falls freely and directly into the single-dose vessel (cup or similar vessel) that is placed therebelow to collect the beverage for drinking.

At the end of the brewing process, followed by the so brewed beverage being dispensed and the pressure exerted onto the bottom 136 of the first cup-shaped body portion 130 being released, the springs 135 urge the same cup-shaped body portion 130, jointly with the disk 170, upwards into the initial position thereof. The upper edge 209 of the capsule 200 is in this way released, thereby allowing the whole passive part 150 to be removed from the machine with the aid of the handle 154. The exhausted capsule, i.e. the capsule that has in this way been emptied of the raw material contained therein, may in this way be conventionally unloaded from the machine and disposed of as provided for by the applying law regulations. The machine is at this point ready to start a new operating cycle, similar to the above-described one.

Fully apparent from the above description is therefore the ability of the present invention to effectively reach the following aims and advantages, i.e.:

since the beverage is dispensed in a direct manner by falling by gravity right into the vessel from which it is drunk by the user, instead of having to follow a fixed, obligatory route inside the machine downstream of the outlet orifices of the capsule, the critical factors indicated earlier in this description in connection with prior-art machines (i.e. difficult, if not right away impossible cleaning of the route followed by the beverage, risk for fatty substances contained in the beverage to ferment and grow rancid in the conduits, and the like) do no longer exist;

no maintenance at all is required for the piercing means used to perforate the lower membrane of the capsule, i.e. the punch, since the latter is not hit and, as a result, fouled by the beverage flowing out of the capsule as it is dispensed, since it is retracted into the box-like accommodation;

the machine itself is simple and reliable in its construction.

Although a preferred embodiment has been used in the above description and in the accompanying drawings to illustrate the present invention, it will be appreciated that a number of different embodiments and variants thereof are possible without departing from the scope of the invention as defined in the appended claims.

The invention claimed is:

1. Machine for preparing and dispensing beverages with the use of at least a capsule (200) containing an edible raw material, in which said capsule comprises a substantially cylindrical body portion (206) with an upper edge (209) and a lower edge (204), onto which there are applied respective sealing membranes (208, 210), as well as with a bottom wall (202) provided with filtering orifices (203) and recessed with respect to said lower edge (204), so that between the corresponding sealing membrane (210) and the lower surface of the same bottom wall (202) there forms a chamber that fills up with the beverage percolating through said orifices (203) prior to dispensing, said machine comprising a functional unit (10) with a so-called active part (100) supported by a load-bearing structure of the machine and a so-called passive part (150) which is adapted to be coupled to said active part (100) and includes a container (151) with an open bottom (156) for holding and retaining the capsule (200), the said active part (100) including:
(a) a base member (110),
(b) a brewing device arranged so as to be aligned along a common vertical axis with the capsule (200) and the open bottom (156) retaining the capsule when said container (151) is fixedly received into said base member (110),
(c) piercing means (173) associated to said brewing device to perforate said upper membrane (208) of the capsule (200),
(d) means (175) for letting hot water or steam under pressure into the capsule (200), and
(e) perforating means for the lower membrane (210) and consisting of punching means (119) adapted to be moved, either prior to the beverage being brewed or at the beginning of the brewing process, from a resting configuration of said functional unit (10) to an operating configuration with the result that the beverage is dispensed directly into the drinking vessel provided therebelow by falling freely thereinto from the capsule (200),
characterized in that in said resting configuration the punching means (119) are offset of the vertical common axis of the brewing device and of the capsule (200) and are adapted to give shape to at least a spout (220) in the capsule (200) by rupturing said lower membrane (210) in said operating configuration.

2. Machine for preparing and dispensing beverages according to claim 1, characterized in that the punching means (119) are part of a lever (114) pivoted on a pin (127) which is offset and perpendicular to said vertical common axis of the brewing device and of the capsule (200).

3. Machine for preparing and dispensing beverages according to claim 1, characterized in that the base member (110) of said active part (100) has an accommodation (112) where said punching means (119) are arranged at a distance from the capsule (200) loaded in said container when said functional unit is in resting configuration.

4. Machine for preparing and dispensing beverages according to claim 2, characterized in that it also comprises an electromagnetic device (120) for moving the lever (114) of which the punching means (119) are part from said resting configuration to said operating configuration.

5. Machine for preparing and dispensing beverages according to claim 4, characterized in that it also comprises a counter-spring connecting the lever (114) of which the punching means (119) are part with said base member (110) of the stationary active part (100) for moving said lever (114) back from said operating configuration to said resting configuration soon after the spout (220) has been formed.

6. Machine for preparing and dispensing beverages according to claim 1, characterized in that the brewing device comprises a first cup-shaped body portion (130), which is provided with a port (137) for admitting the hot water or steam under pressure required to prepare the beverage, and a second cup-shaped body portion (140), which is supported by the load-bearing structure of the machine and arranged coaxially with the first cup-shaped body portion (130), in which said first cup-shaped body portion (130) is capable of sliding along said second cup-shaped body portion (140), in the direction of the capsule (200), owing to water under pressure being let onto the bottom of said first cup-shaped body portion (130) through apertures provided in said second cup-shaped body portion (140).

7. Machine for preparing and dispensing beverages according to claim 1, characterized in that said piercing means for perforating said upper membrane (208) of the capsule (200) comprise a disk (170) attached to the bottom of said first cup-shaped body portion (130) and provided with: a ring-shaped groove (177) adapted to the upper edge (209) of the capsule (200), so as to keep the same capsule firmly locked in place during the beverage brewing process, a plurality of needles or similar puncturing means (173), and a plurality of nozzles (175) to inject hot water or steam under pressure into the capsule (200).

8. A beverage preparation machine in combination with a capsule, the combination comprising:
   a capsule (200) containing an edible raw material, in which said capsule comprises a substantially cylindrical body portion (206) with an upper edge (209) and a lower edge (204), onto which there are applied respective sealing membranes (208, 210), as well as with a bottom wall (202) provided with filtering orifices (203) and recessed with respect to said lower edge (204), so that between the corresponding sealing membrane (210) and the lower surface of the same bottom wall (202) there forms a chamber that fills up with the beverage percolating through said orifices (203) prior to dispensing,
   said machine comprising a functional unit (10) with a so-called active part (100) supported by a load-bearing structure of the machine and a so-called passive part (150) which is adapted to be coupled to said active part (100) and includes a container (151) with an open bottom (156) for holding and retaining the capsule (200), the said active part (100) including:
(f) a base member (110),
(g) a brewing device arranged so as to be aligned along a common vertical axis with the capsule (200) and the open bottom (156) retaining the capsule when said container (151) is fixedly received into said base member (110),
(h) piercing means (173) associated to said brewing device to perforate said upper membrane (208) of the capsule (200),
(i) means (175) for letting hot water or steam under pressure into the capsule (200), and
(j) perforating means for the lower membrane (210) and consisting of punching means (119) adapted to be moved, either prior to the beverage being brewed or at the beginning of the brewing process, from a resting configuration of said functional unit (10) to an operating configuration with the result that the beverage is dispensed directly into the drinking vessel provided therebelow by falling freely thereinto from the capsule (200),
   characterized in that in said resting configuration the punching means (119) are offset of the vertical common axis of the brewing device and of the capsule (200) and are adapted to give shape to at least a spout (220) in the capsule (200) by rupturing said lower membrane (210) in said operating configuration.

9. The beverage preparation machine in combination with a capsule of claim 8, wherein the punching means (119) are part of a lever (114) pivoted on a pin (127) which is offset and perpendicular to said vertical common axis of the brewing device and of the capsule (200).

10. The beverage preparation machine in combination with a capsule of claim 8, wherein the base member (110) of said active part (100) has an accommodation (112) where said punching means (119) are arranged at a distance from the capsule (200) loaded in said container when said functional unit is in resting configuration.

11. The beverage preparation machine in combination with a capsule of claim 9, further comprising an electromagnetic device (120) for moving the lever (114) of which the punching means (119) are part from said resting configuration to said operating configuration.

12. The beverage preparation machine in combination with a capsule of claim 11, further comprising a counter-spring connecting the lever (114) of which the punching means (119) are part with said base member (110) of the stationary active part (100) for moving said lever (114) back from said operating configuration to said resting configuration soon after the spout (220) has been formed.

13. The beverage preparation machine in combination with a capsule of claim 8, wherein the brewing device comprises a first cup-shaped body portion (130), which is provided with a port (137) for admitting the hot water or steam under pressure required to prepare the beverage, and a second cup-shaped body portion (140), which is supported by the load-bearing structure of the machine and arranged coaxially with the first cup-shaped body portion (130), in which said first cup-shaped body portion (130) is capable of sliding along said second cup-shaped body portion (140), in the direction of the capsule (200), owing to water under pressure being let onto the bottom of said first cup-shaped body portion (130) through apertures provided in said second cup-shaped body portion (140).

14. The beverage preparation machine in combination with a capsule of claim 8, wherein said piercing means for perforating said upper membrane (208) of the capsule (200) comprise a disk (170) attached to the bottom of said first cup-shaped body portion (130) and provided with: a ring-shaped groove (177) adapted to the upper edge (209) of the capsule (200), so as to keep the same capsule firmly locked in place during the beverage brewing process, a plurality of needles or similar puncturing means (173), and a plurality of nozzles (175) to inject hot water or steam under pressure into the capsule (200).

* * * * *